US006158745A

United States Patent [19]

Deighton

[11] Patent Number: 6,158,745

[45] Date of Patent: Dec. 12, 2000

[54] FLUID PRESSURE RELIEF SEAL FOR LIQUID AND FLUID-TIGHT COMPARTMENTS

[75] Inventor: Kevin John Deighton, Long Beach, Calif.

[73] Assignee: Pelican Products, Inc., Torrance, Calif.

[21] Appl. No.: 09/045,137

[22] Filed: Mar. 20, 1998

[51] Int. Cl.[7] .............................. F16J 15/10; F16J 15/52; F16J 3/00; F21V 25/00; F21V 29/00

[52] U.S. Cl. .......................... 277/634; 277/644; 277/926; 277/928; 362/158; 362/267

[58] Field of Search .................................... 277/428, 607, 277/616, 626, 634, 642, 644, 907, 926; 362/202, 208, 267, 158

[56] References Cited

U.S. PATENT DOCUMENTS

| | | | |
|---|---|---|---|
| D. 303,846 | 10/1989 | Parker . | |
| 3,381,988 | 5/1968 | Dewar | 277/642 X |
| 3,559,224 | 2/1971 | Shimizu . | |
| 3,601,601 | 8/1971 | Eikenberger . | |
| 4,237,526 | 12/1980 | Wood . | |
| 4,286,311 | 8/1981 | Maglica . | |
| 4,921,258 | 5/1990 | Fournier et al. . | |
| 5,003,440 | 3/1991 | Maglica . | |
| 5,113,326 | 5/1992 | Maglica . | |
| 5,207,502 | 5/1993 | Maglica . | |
| 5,251,917 | 10/1993 | Chee et al. | 277/652 X |
| 5,260,858 | 11/1993 | Maglica . | |
| 5,349,506 | 9/1994 | Maglica . | |
| 5,349,507 | 9/1994 | Parker . | |
| 5,410,457 | 4/1995 | Parker . | |
| 5,485,360 | 1/1996 | Maglica . | |
| 5,535,107 | 7/1996 | Prok . | |
| 5,590,951 | 1/1997 | Matthews | 362/205 |
| 5,722,765 | 3/1998 | Maglica | 362/158 X |
| 5,860,729 | 1/1999 | Bamber | 362/184 |
| 5,904,414 | 5/1999 | Monteleone et al. | 362/202 X |

*Primary Examiner*—Anthony Knight
*Assistant Examiner*—Robert L. Pilaud
*Attorney, Agent, or Firm*—Oppenheimer, Wolff & Donnelly, LLP

[57] ABSTRACT

A fluid pressure relief seal for preventing the ingress of fluid into a container and for venting fluid from the container is disclosed. The fluid pressure relief seal works in conjunction with a container having a receptacle and a lid. The receptacle has a mouth and at least one aperture in the receptacle for venting fluid from the container, while the lid covers the mouth and is engagable with the receptacle. The fluid pressure relief seal comprises a fluid-impermeable washer elastically stretched over an exterior of the receptacle and compressed between the lid and the receptacle when the lid and receptacle are engaged to prevent the passage of fluid into or out of the container. The fluid pressure relief seal also comprises a fluid-impermeable lip seamlessly molded with the washer and elastically stretched over the exterior of the receptacle and apertures in the receptacle for venting fluid from the container. Fluid is vented from the container through the apertures in the receptacle when fluid pressure within the container is sufficient to overcome the compressive force of the lip against the apertures.

25 Claims, 3 Drawing Sheets

FLUID PRESSURE RELIEF SEAL FOR LIQUID AND FLUID-TIGHT COMPARTMENTS

BACKGROUND OF THE INVENTION

1. Field of the Invention

Embodiments of this invention relate generally to seals for fluid-tight compartments for use at depth, and in particular embodiments, to seals that prevent the ingress of fluid into the compartment, yet allow pressurized fluid such as gas to escape from within the compartment.

2. Description of Related Art

Compartments are often used to protect items from the effects of humidity, moisture, and fluids generally. Openings to such compartments must therefore be sealed in a fluid-tight manner. However, the use of a fluid-tight seal may also prevent the escape of pressurized fluid that has built up inside the compartment. It is therefore desirable to have a seal that prevents the ingress of fluids, yet allows pressurized fluids to escape from within the compartment.

An example of a fluid-tight compartment with a need for pressurized fluid venting is the battery compartment of submersible flashlights. Batteries give off hydrogen gas during their operation. In most flashlights, the interior compartment is not airtight, so hydrogen gas given off by the batteries escapes into the environment and does not accumulate in the battery compartment. However, flashlights designed for use in humid or wet conditions or even underwater must provide a fluid-tight interior compartment to prevent corrosion and electrical shorts in circuitry within the compartment. The sealing mechanisms used to make the interior compartment of the flashlight fluid-tight also prevent fluids such as gas from escaping the compartment. Hydrogen gas emitted from batteries will therefore accumulate within the compartment, and may explode if a spark occurs when an operator switches the flashlight on or off.

It is therefore desirable to absorb the hydrogen gas emitted from the batteries or allow it to escape the interior compartment of the flashlight, yet maintain a fluid-tight seal. Hydrogen absorbing pellets have been placed within the interior compartment of waterproof flashlights to absorb hydrogen gas and eliminate the hazard. However, flashlights with multiple or powerful batteries, leaking or defective batteries, reversed polarity batteries, or a combination of old and new batteries may give off more hydrogen gas than the pellets can absorb. In addition, the pellets may become damaged or saturated with moisture, reducing their effectiveness.

To supplement the gas-absorbing pellets, gaskets that act as one-way valves have been used on gaps and orifices of fluid-tight flashlights. These gaskets, typically formed as a lip seal having a flexible flange inclined away from the flashlight interior, prevent fluids from entering the flashlight interior through the gaps or orifices, yet allow hydrogen gas and other fluids under sufficient pressure within the flashlight interior to escape. One such gap exists between the head and body of fluid-tight flashlights that actuate by rotating the head of the flashlight with respect to the body. To maintain a fluid-tight seal, a gasket must be located between the rotating head and body around the entire circumference of the flashlight and must maintain compressive force against the head and body sufficient to prevent the ingress of fluids at all times, even during rotation of the head with respect to the body. The compressive force is also needed to provide frictional resistance during rotation of the head with respect to the body to prevent accidental activation of the flashlight or disengagement of the head from the body. An example of such a gasket is disclosed in U.S. Pat. No. 5,207,502 (see, e.g., FIG. 14, element 49), incorporated herein by reference.

Gaskets that act as one-way valves must allow trapped fluids to overcome the compressive force of the gasket in order for it to escape, and thus the compressive force of the gasket against the head and body of the flashlight must be limited. Gaskets shaped as flexible flanges inclined away from the flashlight interior provide this limited compressive force and one-way valve effect. However, by limiting the compressive force of the gasket, the sealing ability of the gasket is reduced around the entire circumference of the flashlight, increasing the chance of fluid breaching the gasket and reaching the interior compartment. This problem is compounded when a poor fit exists between the head and body due to severe impact, warpage, or dimensional tolerances in the manufacturing of the head and body. In addition, the limited compressive force of the gasket against the head and body of the flashlight reduces the frictional resistance encountered when the head of the flashlight is rotated with respect to the body, increasing the chance of accidental activation of the flashlight or disengagement of the head from the body.

Therefore, there is a need for a fluid pressure relief seal that maintains high compressive forces between the cover and body of a compartment to prevent the ingress of fluid into the compartment, yet allows pressurized fluid within the compartment to escape. In particular, such a fluid pressure relief seal is needed between the rotating head and body of submersible flashlights, where it can maintain high compressive forces on the head and body to prevent the ingress of fluid, yet allow pressurized gas within the flashlight to escape. The high compressive forces are also desirable to maintain high frictional resistance when rotating the head of the flashlight with respect to the body to decrease the chance of accidental activation of the flashlight or disengagement of the head from the body. In accomplishing these functions, it is desirable to keep the fluid sealing mechanism separate from the fluid venting mechanism to allow high compressive forces to be used for the sealing function without impairing the fluid venting function.

SUMMARY OF THE DISCLOSURE

A fluid pressure relief seal for preventing the ingress of fluid into a container and for venting fluid from the container is disclosed. The fluid pressure relief seal works in conjunction with a container having a receptacle and a lid. The receptacle has a mouth and at least one aperture in the receptacle for venting fluid from the container, while the lid covers the mouth and is engagable with the receptacle. In embodiments of the invention, the container may be the battery compartment of a submersible flashlight, the receptacle may hold batteries and a lamp, and the lid may include a transparent focusing lens.

The fluid pressure relief seal comprises a fluid-impermeable washer elastically stretched over an exterior of the receptacle and compressed between the lid and the receptacle when the lid and receptacle are engaged. The compressive force of the washer against the lid and receptacle prevent the passage of fluid into or out of the container. In embodiments of the invention, the washer may be an O-ring shaped gasket made of rubber, and the lid and receptacle may be rotatably engagable by utilizing threads formed in the lid and receptacle.

The fluid pressure relief seal also comprises a fluid-impermeable lip seamlessly molded with the washer and elastically stretched over the exterior of the receptacle and apertures in the receptacle for venting fluid from the container. In embodiments of the invention, the lip may be a ring of rubber. Fluid is vented from the container through the apertures in the receptacle when fluid pressure within the container is sufficient to overcome the compressive force of the lip against the apertures.

DETAILED DESCRIPTION OF PREFERRED EMBODIMENTS

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, although the drawings reference a two-cell flashlight, it is understood that flashlights with other battery configurations fall within the scope of the preferred embodiments of the present invention. In addition, although the description and drawings reference a submersible flashlight, fluid pressure relief seals according to embodiments of the present invention may be used with any system utilizing fluid-tight compartments with covers where the build-up of pressurized fluid within the compartment is possible. Finally, it should be noted that "fluid," as defined herein, encompasses both liquids and gas.

Batteries give off hydrogen gas during their operation. In most battery-powered flashlights, the interior compartment is not fluid-tight, so hydrogen gas given off by the batteries escapes into the environment and does not accumulate in the interior compartment. However, flashlights designed for use in humid or wet conditions or even underwater must provide a fluid-tight interior compartment to prevent corrosion and electrical shorts in circuitry within the compartment. The sealing mechanisms used to make the flashlight fluid-tight also prevent fluids such as gas from escaping the interior, and therefore hydrogen gas emitted from the batteries will accumulate within the interior compartment. Hydrogen gas is explosive, and accumulated hydrogen gas may explode if a spark occurs when an operator activates the flashlight.

Figure 1:
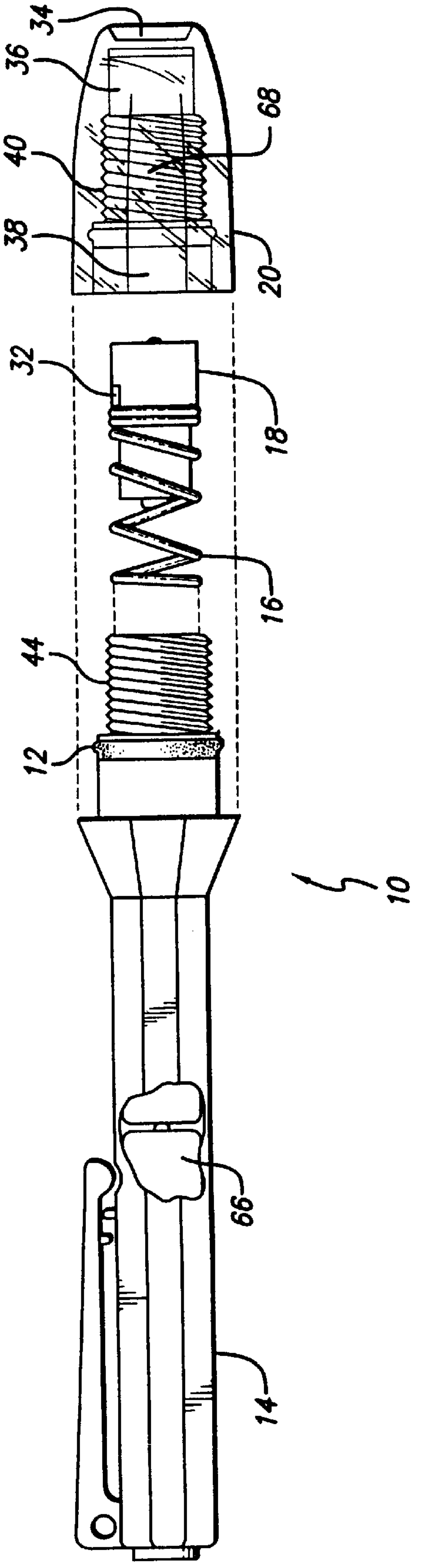
FIG. 1 is a side view of a submersible flashlight with a fluid pressure relief seal according to an embodiment of the invention.
Figure 2:
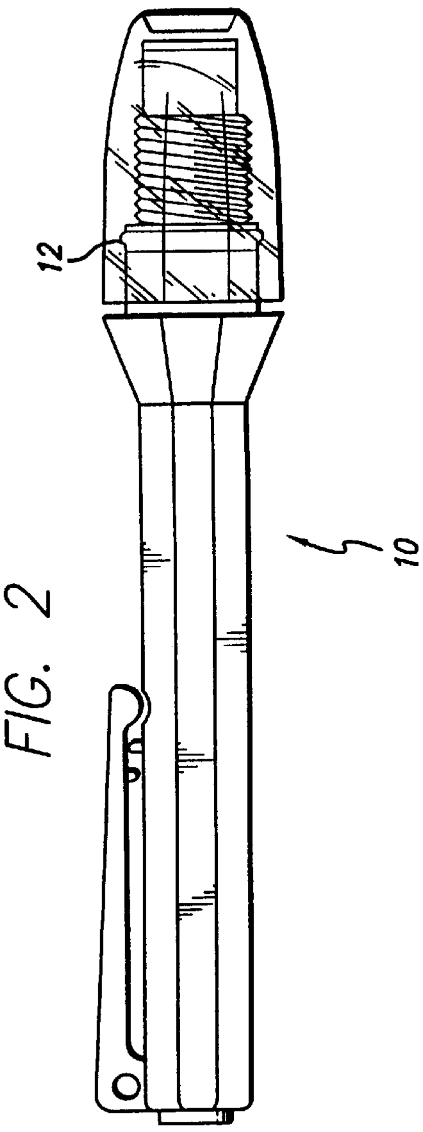
FIG. 2 is an exploded view, partially broken away, of a submersible flashlight with a fluid pressure relief seal according to an embodiment of the invention.
Figure 3:
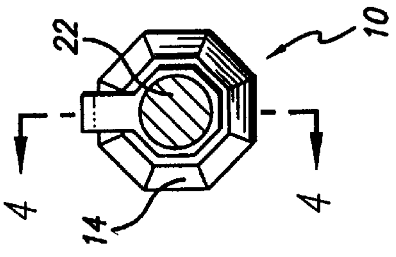
FIG. 3 is an end view of a submersible flashlight with a fluid pressure relief seal according to an embodiment of the invention.
Figure 4:
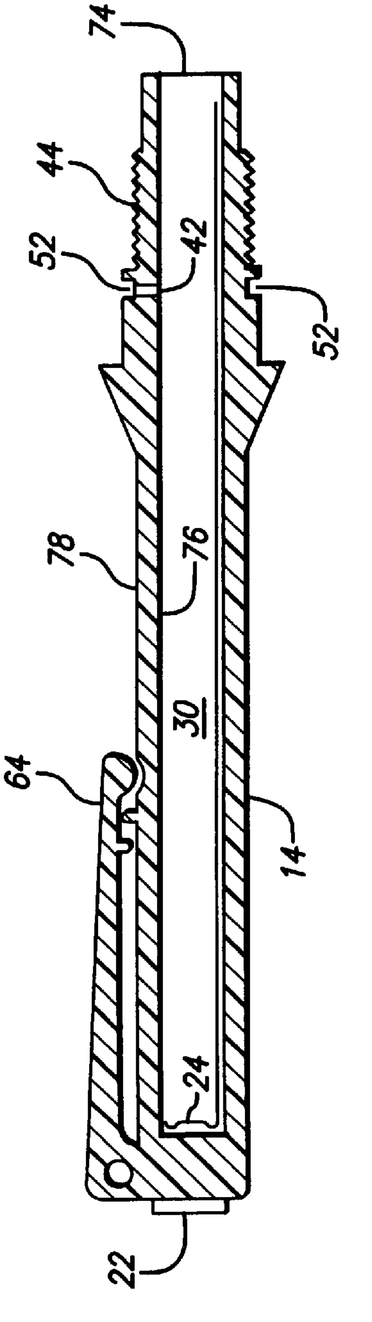
FIG. 4 is a cross-sectional side view of the body of a submersible flashlight according to an embodiment of the invention, taken along the line 4—4 in FIG. 3 and looking in the direction of the appended arrows.
Figure 5:
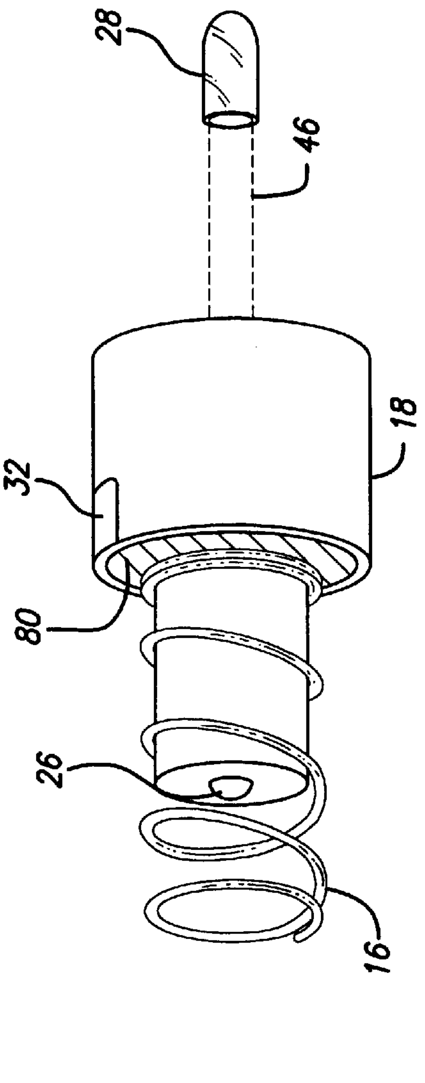
FIG. 5 is a perspective view of the lamp module of a submersible flashlight according to an embodiment of the invention.

It is therefore desirable to design a submersible flashlight that absorbs hydrogen gas discharged from the batteries and also allows it to escape the interior of the flashlight, while maintaining a fluid-tight interior compartment. A submersible flashlight 10 according to an embodiment of the invention is shown in FIG. 1. As shown in FIG. 2, submersible flashlight 10 comprises unitary body 14 made of a fluid-impermeable material for holding batteries 66 within, fluid pressure relief seal 12 formed from a elastic material such as rubber and stretched over the outer circumference of body 14, lamp module 18 slidably insertable into body 14, spring 16 coupled to lamp module 18, and head 20 formed from a single piece of transparent fluid-impermeable material and rotatably engagable with body 14. Head 20 comprises focusing lens 34 that forms the closed end of head 20, lamp module cavity 36 within head 20 and adjacent focusing lens 34, body cavity 38 adjacent to the open end of head 20, and internal threads 40 surrounding thread cavity 68 located between lamp module cavity 36 and body cavity 38. In alternate embodiments of the invention, focusing lens 34 may be clear or tinted and may be flat, convex, or concave. FIG. 3 shows an end view of submersible flashlight 10, including magnet 22 coupled to body 14 for removably coupling submersible flashlight 10 to metal structures. In alternate embodiments of the invention, the magnet 22 may be eliminated. Referring to FIG. 4, body 14 comprises battery compartment 30 within body 14 defined by interior surface 76, clip-on member 64 integrally formed with body 14 for removably coupling the submersible flashlight to support structures such as a shirt pocket, at least one vent hole 42 formed in body 14 and creating a fluid passage between battery compartment 30 and the outside environment, battery opening 74 at the end of body 14 opposite magnet 22, external threads 44 formed on exterior surface 78 about battery opening 74, and blade 24 located along the back and side of battery compartment 30 for contacting batteries 66 (not shown in FIG. 4). It should be noted that although vent hole 42 is shown substantially aligned with clip-on member 64 in FIG. 4, in embodiments of the invention vent hole 42 may be located anywhere along a circumferential channel 52 formed in the exterior surface 78 of body 14. As shown in FIG. 5, lamp module 18 comprises lamp 28 with leads 46 slidably insertable into lamp module 18, outer contact 80 fixedly attached to lamp module 18 for coupling to one lead 46 of lamp 28 (coupling not shown in FIG. 5), inner contact 26 fixedly attached to lamp module 18 for coupling to another lead 46 of lamp 28 (coupling not shown in FIG. 5), and gas-absorbing pellet 32 embedded in lamp module 18 for absorbing hydrogen gas within battery compartment 30 (not shown in FIG. 5).

To operate submersible flashlight 10, batteries 66 are inserted into battery compartment 30 of body 14 until they come into contact with the portion of blade 24 located at the rear of battery compartment 30. Lamp module 18 is then partially inserted into battery compartment 30, and finally head 20 is coupled to body 14 by rotatably engaging external threads 44 of body 14 and internal threads 40 of head 20. As rotation of head 20 with respect to body 14 further engages head 20 and body 14, spring 16 compresses, bringing lamp module 18 closer to batteries 66. After sufficient rotation of head 20 with respect to body 14, inner contact 26 will contact batteries 66, and outer contact 80 will contact blade 24, activating submersible flashlight 10. Submersible flashlight 10 is deactivated by reversing the rotation of head 20 with respect to body 14 until either inner contact 26 no longer contacts batteries 66 or outer contact 80 no longer contacts blade 24.

Figure 6:
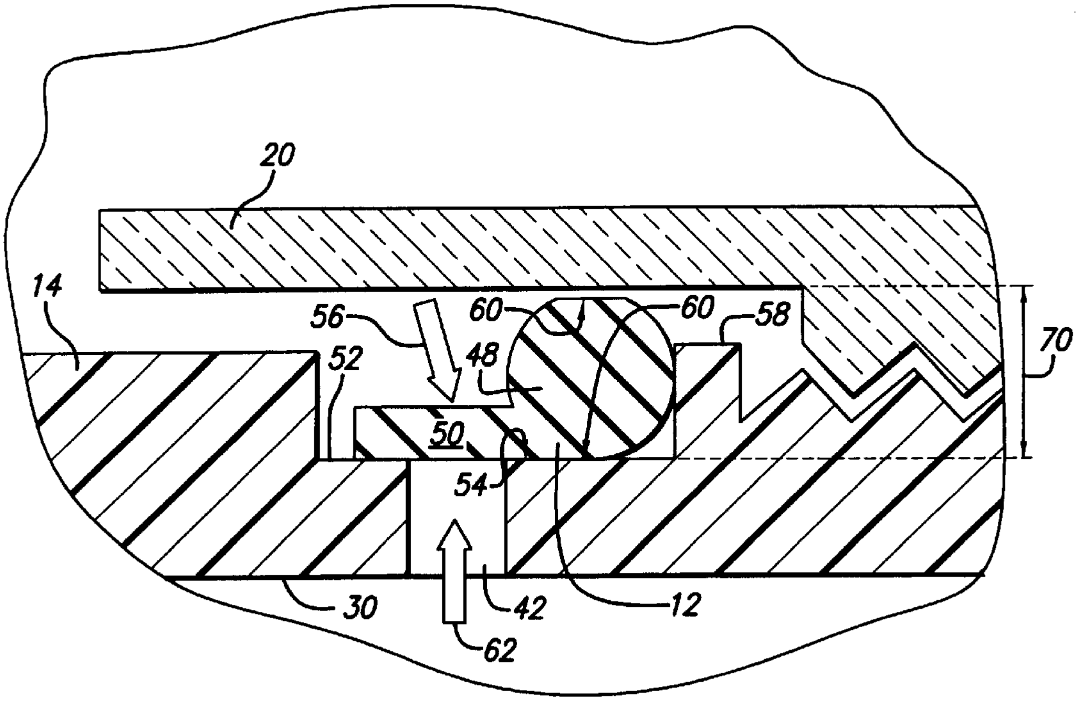
FIG. 6 is an enlarged cross-sectional side view of the fluid pressure relief seal compressed between the flashlight head and body according to an embodiment of the invention.
Figure 7:
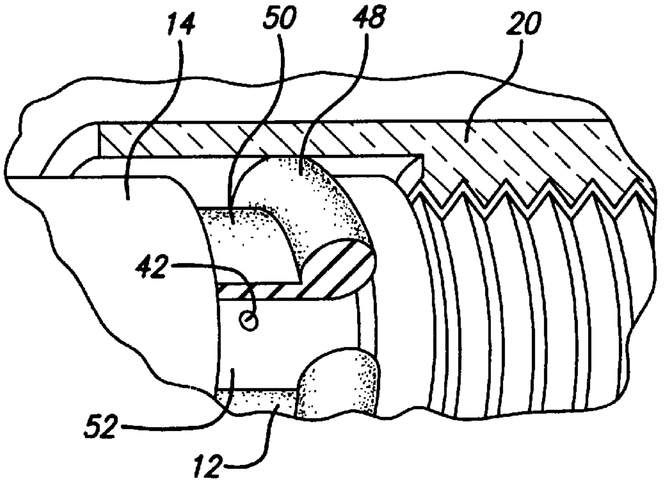
FIG. 7 is an enlarged perspective view, partially broken away, of the fluid pressure relief seal and flashlight head and body according to an embodiment of the invention.

Fluid pressure relief seal 12 and body 14 are shown in greater detail in FIG. 6 and FIG. 7. Fluid pressure relief seal 12 comprises O-ring gasket 48 and skirt 50 formed in the general shape of a ring from a single piece of elastic material such as rubber, seated in channel 52 formed along the entire outer circumference of body 14. Skirt 50 covers vent hole 42 formed in the bottom of channel 52. Channel 52 prevents fluid pressure relief seal 12 from uncovering vent hole 42 or sliding off body 14. The inner diameter of fluid pressure relief seal 12 is less than the outer diameter of body 14 measured within channel 52, such that fluid pressure relief seal 12 must stretch and temporarily deform when inserted into channel 52. This stretching of fluid pressure relief seal 12 causes O-ring gasket 48 and skirt 50 to exert elastic force 54 against body 14. Elastic force 54 prevents fluid 56 from entering battery compartment 30 by passing between skirt 50 and body 14 and through vent hole 42. However, sufficient fluid pressure 62 will overcome elastic force 54 of skirt 50 against vent hole 42, temporarily deforming skirt 50 and allowing pressurized gas to escape from battery compartment 30 by passing through vent hole 42 and between skirt 50 and body 14.

When head 20 is engaged about body 14, channel gap 70 between the interior surface of head 20 and the bottom of channel 52 is narrower than the uncompressed outer diameter of O-ring gasket 48, such that O-ring gasket 48 is compressed between head 20 and body 14 and exerts compressive force 60 against head 20 and body 14. FIG. 6 shows O-ring gasket 48, normally circular in cross section, compressed where it contacts head 20 and body 14. Compressive force 60 prevents fluid 56 from entering battery compartment 30 through gap 58 between head 20 and body 14. Compressive force 60 also provides frictional resistance when head 20 is rotated with respect to body 14, which helps to minimize accidental activation of lamp 28 or disengagement of head 20 from body 14. It should be noted that although the drawings and specification describe rotatable engagement of head 20 and body 14 by threads, in other embodiments of the invention head 20 and body 14 may be engaged by pushing head 20 over body 14 and relying on the frictional resistance supplied by compressive force 60 against head 20 and body 14.

Therefore, according to the foregoing description, use of O-ring gasket 48 in the present invention will prevent the ingress of fluid 56 into battery compartment 30 and provide sufficient frictional resistance to prevent accidental activation of lamp 28 or disengagement of head 20 from body 14, while use of skirt 50 and vent hole 42 in an embodiment of the present invention creates a separate one-way valve for allowing pressurized fluid to escape from battery compartment 30 through vent hole 42.

The foregoing description of preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A sealable compartment, comprising:

a body having an interior compartment and an opening to the interior compartment;

a head for covering the opening to the interior compartment, the head being removable engagable with the body;

at least one vent hole in the body for venting fluid from the interior compartment; and a fluid pressure relief seal elastically stretched about an exterior of the body and exerting a compressive force against the body for preventing the ingress of fluid into the interior compartment and for venting fluid from the interior compartment, comprising a gasket compressible between the head and the body when the head and body are engaged for preventing the passage of fluid into or out of the interior compartment, and a skirt formed as a unitary structure with the gasket for covering the at least one vent hole and for venting fluid from the interior compartment when fluid pressure within the interior compartment is sufficient to overcome the compressive force of the skirt against the at least one vent hole.

2. The sealable compartment of claim 1, wherein the interior compartment is capable of holding at least one battery and a lamp for coupling to the at least one battery.

3. The sealable compartment of claim 2, wherein the head comprises a transparent lens for passing light emitted from the lamp.

4. The sealable compartment of claim 3, wherein the transparent lens is tinted for generating message signals.

5. The sealable compartment of claim 1, further including a circumferential channel formed in the exterior of the body for maintaining proper alignment of the fluid pressure relief seal with respect to the body, wherein the at least one vent hole is located in the channel and the fluid pressure relief seal seats in the channel to ensure that the fluid pressure relief seal covers the at least one vent hole.

6. The sealable compartment of claim 1, wherein the gasket is in the shape of an O-ring.

7. The sealable compartment of claim 1, wherein the skirt is in the shape of a ring.

8. The sealable compartment of claim 1, wherein the gasket and skirt are formed from an elastomer.

9. The sealable compartment of claim 1, wherein the head and body are rotatably engagable.

10. The sealable compartment of claim 1, wherein the head and body are removably engagable by pushing the head over the opening to the interior compartment and relying on frictional resistance supplied by the compressible gasket against the head and body to engage the head and body.

11. A fluid pressure relief seal for preventing the ingress of fluid into a container and for venting fluid from the container, the container having a receptacle with a mouth and at least one aperture in the receptacle for venting fluid from the container, and a lid engagable with the receptacle for covering the mouth, the fluid pressure relief seal comprising:

a fluid-impermeable washer elastically stretchable about an exterior of the receptacle and compressible between the lid and the receptacle when the lid and receptacle are engaged for preventing the passage of fluid into or out of the container; and a fluid-impermeable lip seamlessly molded with the washer and elastically stretchable about the exterior of the receptacle for covering the at least one aperture and for venting fluid from the container when fluid pressure within the container is sufficient to overcome the compressive force of the lip against the at least one aperture.

12. The fluid pressure relief seal of claim 11, wherein the washer is in the shape of a toroid.

13. The fluid pressure relief seal of claim 11, wherein the lip is in the shape of a ring.

14. The fluid pressure relief seal of claim 11, wherein the washer and lip are formed from an elastomer.

15. A sealable compartment comprising:

a body having an interior compartment and an opening to the interior compartment;

a head for covering the opening to the interior compartment, the head being removably engagable with the body;

at least one vent hole in the body for venting fluid from the interior compartment; and a fluid pressure relief seal elastically stretched about an exterior of the body and exerting a compressive force against the body for preventing the ingress of fluid into the interior compartment and for venting fluid from the interior compartment, comprising a gasket compressible between the head and the body when the head and body are engaged, the gasket being for preventing the passage of fluid between the head and the body, and a skirt formed as a unitary structure with the gasket for covering the at least one vent hole and for venting fluid from the interior compartment when fluid pressure within the interior compartment is sufficient to overcome the compressive force of the skirt against the at least one vent hole.

16. The sealable compartment as claimed in claim 15 wherein the body is for locating a battery and the head is for locating a lens and a lamp, and there is an electrical circuit between the lamp and battery and including a switch, and wherein the compartment is a structure for a flashlight.

17. A sealable compartment comprising:

a body having an interior compartment and an opening to the interior compartment;

a head for covering the opening to the interior compartment, the head being removably engagable with the body;

at least one vent hole in the body for venting fluid from the interior compartment; and a fluid pressure relief seal elastically stretched about an exterior of the body and exerting a compressive force against the body for preventing the ingress of fluid into the interior compartment and for venting fluid from the interior compartment, the seal comprising:

a gasket compressible between the head and the body when the head and body are engaged thereby to prevent the passage of fluid past the gasket, and a skirt for covering the at least one vent hole and for venting fluid from the interior compartment when fluid pressure within the interior compartment is sufficient to overcome the compressive force of the skirt against the at least one vent hole.

18. The sealable compartment as claimed in claim 17 wherein the body is for locating a battery and the head is for locating a lens and lamp, and there is an electrical circuit between the lamp and battery and including a switch, and wherein the compartment is a structure for a flashlight.

19. A sealable compartment comprising:

a body having an interior compartment and an opening to the interior compartment;

a head for covering the opening to the interior compartment, the head being removably engagable with the body;

at least one vent hole in the body for venting fluid from the interior compartment; and a fluid pressure relief seal elastically stretched about an exterior of the body and exerting a compressive force against the body, the seal comprising:

a gasket compressible between the head and the body when the head and body are engaged to regulate the frictional engagement between the head and the body, and a skirt operable to cover the at least one vent hole and for venting fluid from the interior compartment when fluid pressure within the interior compartment is sufficient to overcome the compressive force of the skirt against the at least one vent hole.

20. The sealable compartment as claimed in claim 19 wherein the body is for locating a battery and the head is for locating a lens and a lamp, and there is an electrical circuit between the lamp and battery and including a switch, and wherein the compartment is a structure for a flashlight.

21. A flashlight comprising:

a body having an interior compartment for a battery for the flashlight and an opening to the interior compartment;

a head for covering the opening to the interior compartment, the head being removably engagable with the body, the head including a lamp and a lens for the flashlight;

at least one vent hole in the body adjacent a location of the head for venting fluid from the interior compartment; and a fluid pressure relief seal elastically stretched about an exterior of the body and exerting a compressive force against the body, comprising a gasket compressible between the head and the body when the head and body are engaged thereby to regulate the movement between the head and the body and thereby the closure and opening of a switch for an electrical circuit between the battery and the lamp; and a skirt for covering the at least one vent hole adjacent to the head and for venting fluid from the interior compartment when fluid pressure within the interior compartment is sufficient to overcome the compressive force of the skirt against the at least one vent hole.

22. A flashlight comprising:

a body having an interior compartment for a battery for the flashlight and an opening to the interior compartment;

a head for covering the opening to the interior compartment, the head being removably engagable with the body, the head including a lamp and a lens for the flashlight;

at least one vent hole in the body adjacent a location of the head for venting fluid from the interior compartment; and a fluid pressure relief seal elastically stretched about an exterior of the body and exerting a compressive force against the body, comprising a gasket compressible between the head and the body when the head and body are engaged to thereby regulate a movement between the head and the body and thereby a relative physical rigidity of the head and lens relative to the body, and a skirt for covering the at least one vent hole adjacent to the head and for venting fluid from the interior compartment when fluid pressure within the interior compartment is sufficient to overcome the compressive force of the skirt against the at least one vent hole.

23. A flashlight comprising:

a body having an interior compartment for a battery for the flashlight and an opening to the interior compartment;

a head for covering the opening to the interior compartment, the head being removably engagable with the body, the head including a lamp and a lens for the flashlight;

at least one vent hole in the body adjacent a location of the head for venting fluid from the interior compartment; and a fluid pressure relief seal elastically stretched about an exterior of the body and exerting a compressive force against the body, comprising a gasket compressible between the head and the body when the head and body are engaged to thereby regulate a movement between the head and the body, the gasket having a substantially O-ring profile, and a skirt for covering the at least one vent hole adjacent to the head and for venting fluid from the interior compartment when fluid pressure within the interior compartment is sufficient to overcome the compressive force of the skirt against the at least one vent hole.

24. A sealable compartment comprising:

a body having an interior compartment and an opening to the interior compartment;

a head for covering the opening to the interior compartment, the head being removably engagable with the body;

at least one vent hole in the body for venting fluid from the interior compartment; and a fluid pressure relief seal elastically stretched about an exterior of the body and exerting a compressive force against the body and for venting fluid from the interior compartment, the seal comprising a skirt formed for covering the at least one vent hole and for venting fluid from the interior compartment when fluid pressure within the interior compartment is sufficient to overcome the compressive force of the skirt against the at least one vent hole, and wherein at least one of the size of the vent hole or a number of vent holes is selected relative to the skirt to thereby permit of the operation of the pressure relief valve to operate relative to the pressure in the interior compartment.

25. The sealable compartment as claimed in claim 24 wherein the body is for locating a battery and the head is for locating a lens and lamp, and there is an electrical circuit between the lamp and battery and including a switch, and wherein the compartment is a structure for a flashlight.

* * * * *